United States Patent
Young et al.

(10) Patent No.: US 6,563,844 B1
(45) Date of Patent: *May 13, 2003

(54) HIGH LOSS MODULATION ACOUSTO-OPTIC Q-SWITCH FOR HIGH POWER MULTIMODE LASER

(75) Inventors: Eddie H. Young, Melbourne, FL (US); Robert V. Belfatto, Sr., Melbourne Beach, FL (US); Carlos M. Carbonell, Palm Bay, FL (US)

(73) Assignee: Neos Technologies, Inc., Melbourne, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,665

(22) Filed: Aug. 5, 1999

Related U.S. Application Data

(60) Provisional application No. 60/105,156, filed on Oct. 21, 1998.

(51) Int. Cl.[7] .............................. H01S 3/117; H01S 3/30
(52) U.S. Cl. ............................................. 372/13; 372/3
(58) Field of Search ........................................ 372/13, 3

(56) References Cited

U.S. PATENT DOCUMENTS

| | | | |
|---|---|---|---|
| 4,337,442 A | 6/1982 | Mauck | 372/13 |
| 4,412,330 A | 10/1983 | Mauck | 372/29 |
| 4,641,273 A * | 2/1987 | Casasent | 364/822 |
| 4,918,699 A * | 4/1990 | Boyd et al. | 372/21 |
| 4,930,901 A | 6/1990 | Johnson et al. | 372/26 |
| 4,979,176 A | 12/1990 | Young et al. | 372/13 |
| 5,130,995 A | 7/1992 | Grossman et al. | 372/13 |
| RE34,192 E | 3/1993 | Baer | 372/10 |
| 5,197,074 A | 3/1993 | Emmons, Jr. et al. | 372/26 |
| 5,268,911 A | 12/1993 | Young | 372/13 |
| 5,569,929 A * | 10/1996 | Mizutani et al. | 250/548 |

OTHER PUBLICATIONS

"Unified Approach to Ultrasonic Light Diffraction", by W.R. Klein and Bill D. Cook, IEEE Transactions on Sonics and Ultrasonics, vol. SU–14, No. 3, Jul. 1967, pp. 123–131.

* cited by examiner

*Primary Examiner*—Paul Ip
*Assistant Examiner*—Cornelius H. Jackson
(74) *Attorney, Agent, or Firm*—Allen, Dyer, Doppelt, Milbrath & Gilchrist, P.A.

(57) ABSTRACT

A Q-switch modulator for a high power laser having a randomly polarized output beam and large divergence angle employs a cascaded arrangement of longitudinal mode acousto-optic modulators, each of which has a Raman Nath or near Raman Nath interaction length. The modulators are optically cascaded such that the distance the randomly polarized laser beam travels through the modulators is effectively confined to the sum of the non coherent interaction lengths thereof. Due to the substantial power level of the laser output, there is heating of the bulk material, which usually results in a shift in the Bragg angle. This has minimal if any effect on the shorter interaction length of the Q-switch modulator of the invention. Also, heating of the bulk material is countered by the incorporation of cooling fluid channels in a heat sink support block coupled in thermal communication with the bulk material. The heat sink support structure is configured to be effectively mechanically floating with respect to a support housing for the Q-switch.

30 Claims, 5 Drawing Sheets

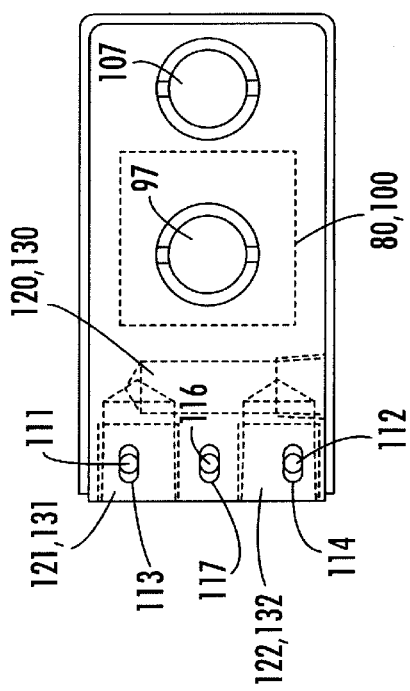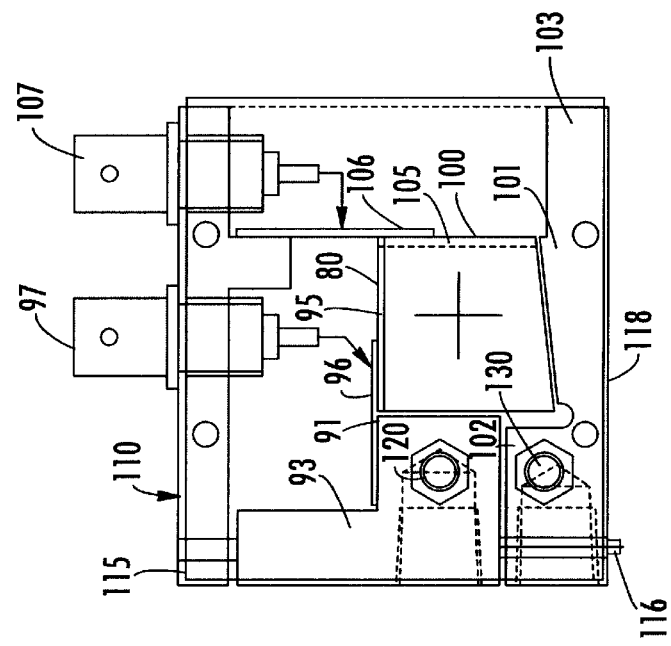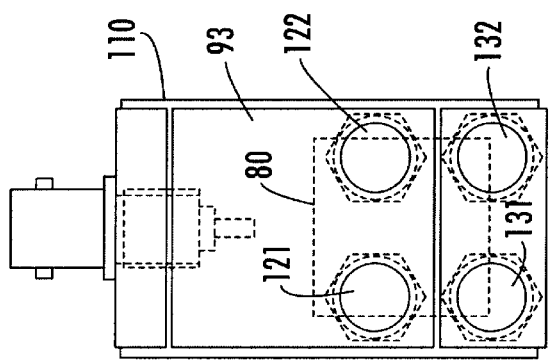

HIGH LOSS MODULATION ACOUSTO-OPTIC Q-SWITCH FOR HIGH POWER MULTIMODE LASER

CROSS-REFERENCE TO RELATED APPLICATION

The present application claims the benefit of copending U.S. Provisional Patent Application Ser. No. 60/105,156, filed Oct. 21, 1998, entitled: "High Loss Modulation Acousto-Optic Q-Switch for High Power Multimode Laser," by Eddie H. Young et al, assigned to the assignee of the present application and the disclosure of which is incorporated herein.

FIELD OF THE INVENTION

The present invention relates in general to laser beam modulation, and is particularly directed to a new and improved mechanism for (Q-switch) modulating a high power laser, such as multimode laser having a randomly polarized output beam and large divergence angle. The Q-switch mechanism of the invention employs a plurality of longitudinal mode acousto-optic modulators, each of which has a relatively short, Raman Nath or near Raman Nath based non-coherent interaction length, and being optically cascaded such that the distance the randomly polarized laser beam travels through the modulators is effectively confined to the sum of the non-coherent interaction lengths thereof.

BACKGROUND OF THE INVENTION

Acousto-optic Q-switches for controllably modulating (e.g., ON-OFF switching) randomly polarized laser beams have customarily been installed within the Fabry-Perot etalon cavity of the laser, and are controllably operative to variably and selectively modify the optical loss within the laser resonator cavity, thereby controlling initiation, amplitude and duration of the laser output beam. For 'high-loss' modulation, depletion in excess of 75% and usually in a range of at least 85–95% is necessary to prevent the laser cavity from lasing under high gain and intense pumping conditions.

For achieving high power, multimode operation is necessary. However, in a multimode operation, the laser beam is non-Gaussian and has a substantial divergence angle (on the order of five to ten milliradians or higher). This mandates that the interaction distance through the Q-switch medium be relatively long, in order to achieve high efficiency. This increase in modulator length is in conflict with the condition that, in order to satisfy the coherence requirement in an increased length acousto-optic medium, the acceptance angle must be decreased.

As a non-limiting example, for a continuous wave laser producing an output wavelength of 1.06 microns, a typical acousto-optic Q switch may be made of fused silica and operates at a frequency of 27 MHz. For longitudinal wave mode operation, the fused silica medium may have a height of 3.5 mm, a length of 42 mm, and an acousto-optic Q of 4.21. For shear wave mode operation, the fused silica device may have a height of 3.5 mm, a length of 42 mm, and an acousto-optic Q of 10.6.

Because the loss modulation efficiency for a longitudinal mode fused silica Q-switch is higher for vertical polarization than it is for horizontal polarization, it would seem that two orthogonally polarized devices might be employed to provide high loss modulation for a randomly polarized laser. However, because currently available Q switches have a relatively high acousto-optic Q value, they are not optimum, and are unable to effectively quench high power lasers whose outputs may be well over one hundred watts and have a divergence angle on the order of five milliradians or more.

Moreover, although both conventional longitudinal mode and shear mode Q-switches are capable of providing high loss modulation, as long as the laser beam is coincident with the Bragg angle of the switch, they suffer a significant reduction in efficiency.when the laser beam is not aligned with the Bragg angle. This results in a substantial reduction in loss modulation efficiency for high power, multimode laser applications, whose typical five milliradians or greater divergence angle causes Bragg angle misalignment of some portion of the beam.

While this problem might seem resolvable by placing two identical Q-switches in the laser cavity to take advantage of the cumulative loss modulation effect, its has been observed that installing two identical Q-switches in the resonant cavity of a high power, multi-mode laser results in a substantial reduction in output beam power. This laser output power reduction is due to the fact that the 'windows' through the two Q-switches are of the same path length and parallel to each other along the beam axis. As a result, the etalon effect restricts the number of longitudinal modes that can be supported within the cavity, thereby causing a reduction in laser output power.

For an illustration of non-limiting examples of literature describing various conventional Q-switch arrangements, attention may be directed to the following U.S. Pat. Nos.: 5,268,911 to E. Young; 4,979,176 to E. Young et al; 5,197,074 to D. Emmons et al; Re. 34,192 to T. Baer; 4,930,901 to J. Johnson et al; 4,337,442 to M. Mauck; and 5,130,995 to W. Grossman et al.

SUMMARY OF THE INVENTION

In accordance with the present invention, the desire to provide a high modulation loss efficiency, high acceptance angle, Q-switch for a high power (multimode) laser, whose output beam is randomly polarized and has a substantial divergence angle is successfully achieved by a cascaded arrangement of orthogonally polarized longitudinal mode acousto-optic modulators, each having a relatively short, Raman Nath or near Raman Nath-based non-coherent interaction length. By relatively short, Raman Nath or near Raman Nath-based non-coherent interaction length is meant that the beam travel path through a respective modulator's bulk material is considerably less than that required for proper Q-switch operation for a well collimated beam at a given power level, yet achieves a loss modulation efficiency that is sufficiently high to prevent the laser cavity from lasing under high gain and intense pumping conditions, even when the incident beam has a relatively large acceptance angle (on the order of five mrad or more).

The relatively short, Raman Nath or near Raman Nath Q-switch mechanism of the invention incorporates more Raman Nath or near Raman Nath interaction with the traveling acoustic wave in the bulk material. The laser beam is scattered into multiple orders, with the laser beam set at normal incidence, rather than being aligned with the Bragg angle, thereby allowing a relatively large acceptance angle (on the order of five mrad or more). This is very advantageous when the Q-switch is employed to extinguish. laser beams with a large angular divergence. Also, the relatively short Raman Nath or near Raman Nath interaction length means that the overall intra-cavity length can be reduced for narrower Q-switch pulse applications.

The cascaded AO Q-switch arrangement of the invention contains a plurality (e.g., pair) of orthogonally polarized longitudinal mode acousto-optic modulators, each of which has a prescribed, relatively short, Raman Nath or near Raman Nath interaction length, that physically and optically 'stacked' relatively close to one another, so that the overall beam travel distance therethrough is effectively confined to the sum of the respective non-coherent interaction lengths thereof. The modulators may be formed as discrete devices or they may be integrated within the same acousto-optic bulk material.

Due to the substantial power level of a high power laser with which the invention is employed, there is unavoidable heating of the bulk material, which usually results in a shift in the Bragg angle. Although this adversely affects the performance of a device having a long interaction length, it has minimal effect on the shorter interaction length of the Q-switch modulator of the invention. Moreover, the actual heating of the bulk material is countered by the incorporation of cooling fluid channels in a heat sink coupled in thermal communication with the bulk material.

The inherent heating of the bulk material that results from the substantial power level of the laser may be effectively countered by incorporating cooling fluid channels in a heat sink support block to which the bulk material of each of the cascaded orthogonally polarized Q-switch devices is mounted. The support and cooling arrangement for a cascaded arrangement may be configured to support and cool the modulators as discrete components, or as devices integrated within the same acousto-optic bulk material. In the integrated bulk support and cooling arrangement, in addition to the provision of an internal channel for the passage of a cooling fluid (e.g. water), the heat sink components of the packaging architecture for the two integrated wide acceptance angle Q-switch modulators are configured to be effectively mechanically floating with respect to the support housing, so as to reduce the build-up of thermally induced stresses.

In addition to being non-coherently driven in a longitudinal mode configuration, the AOM devices may be non-coherently driven with respectively different frequencies for shear mode acoustic waves. In this mode of operation, the minimum frequency difference requires a time bandwidth product of one or greater.

BRIEF DESCRIPTION OF THE DRAWINGS

FIGS. 8, 9, and 10 are respective end, top, and side views of a support and cooling arrangement for wide angle acceptance Q-switch devices integrated within the same acousto-optic bulk material.

DETAILED DESCRIPTION

Figure 1:
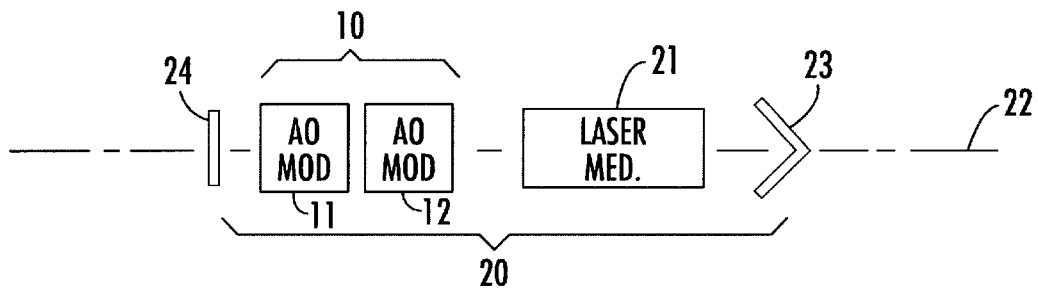
FIG. 1 diagrammatically illustrates the architecture of a laser system that employs a cascaded Q-switch arrangement of the invention within the laser cavity.

FIG. 1 diagrammatically illustrates the architecture of a high power, multimode laser system having a cascaded acousto-optic (AO) Q-switch arrangement 10 of the present invention installed within a laser resonator 20. The resonator 20 is shown as including a pumped high power laser medium 21, such as, but not limited to a YAG laser, a Homien YAG laser operating at 2.1 microns, and an Erbium YAG laser operating at 2.94 microns. The etalon length of the resonator 20 along its optical axis 22 is defined by the optical cavity separation between a retro-reflector 23 and an output beam exit mirror 24. The pumped laser medium 21 produces a multimode output beam having a substantial divergence angle (e.g., a divergence angle lying in a range of from zero to ten mrad) and typically on the order of at least five mrad.

The cascaded AO Q-switch arrangement 10 contains a plurality of orthogonally polarized longitudinal mode acousto-optic modulators, e.g., a pair of modulators shown at 11 and 12, each of which has a prescribed, relatively short, Raman Nath or near Raman Nath interaction length. For a non-limiting example of an article describing the Raman Nath or near Raman Nath property, attention may be directed to the article by W. Klein et al, entitled: "Unified Approach to Ultrasonic Light Diffraction," IEEE transactions on Sonics and Ultrasonics Vol. SU-14, No. 3, July 1967, pp 123–134.

The AO modulators 11 and 12 are physically and optically 'stacked' relatively close to one another, so that the overall beam travel distance therethrough is effectively confined to the sum of the respective non-coherent interaction lengths thereof. As will be described below with reference to the support and cooling packaging structures shown in FIGS. 5–10, the modulators 11 and 12 may be formed as discrete devices or they may be integrated within the same acousto-optic bulk material.

As pointed out above, by relatively short Raman interaction length is meant that the beam travel path through a respective modulator's bulk material (e.g., fused silica) is considerably less than that required for proper Q-switch operation for a well collimated beam at a given power level, yet achieves a loss modulation efficiency that is sufficiently high to prevent the laser cavity from lasing under high gain and intense pumping conditions, even when the incident beam has a relatively large acceptance angle (on the order of five mrad or more). Namely, contrary to the case of a well collimated (effectively non-diverging) beam, that allows Bragg angle alignment over a sufficiently long interaction distance for high loss modulation efficiency (e.g., Q=8 or higher) in a high power (multimode) laser, on the other hand, where the optical energy has substantial divergence (on the order of five mrad or more), such a long 'coherent' interaction distance is actually not helpful.

Investigation by the inventors has revealed that the shorter Raman Nath or near Raman Nath interaction length of the invention incorporates more Raman Nath or near Raman Nath interaction with the traveling acoustic wave in the bulk material, and the laser beam is scattered into multiple orders, with the laser beam set at normal incidence, rather than being aligned with the Bragg angle, thereby allowing the relatively large acceptance angle (e.g., for applications where Q=4 or less). This attribute of the reduced length modulator is very advantageous when the Q-switch is employed to extinguish laser beams with a large angular divergence. Also, the relatively short Raman Nath or near Raman Nath interaction length means that the overall intra-cavity length can be reduced for narrower Q-switch pulse applications.

Due to the substantial power level, there is unavoidable heating of the bulk material, which usually results in a shift in the Bragg angle. Although this would normally adversely affect the performance of a device having a long interaction length (which requires strict adherence to Bragg angle alignment), it has minimal or no effect on the shorter interaction length of the Q-switch modulator of the invention (which enjoys a wide acceptance angle for the incident laser beam). Moreover, the actual heating of the bulk material is countered by the incorporation of cooling fluid channels in a heat sink coupled in thermal communication with the bulk material.

For a continuous wave multimode laser having an output beam wavelength of 1.06 microns, at a power level of 30 watts, as a non-limiting example, the (fused silica) bulk material of each of the longitudinal mode acousto-optic Q switches 11 and 12 may be driven by a switching signal having an RF frequency of 27 MHz applied to a transducer 14 bonded to a wave-launching surface of the silica bulk. The fused silica medium of each modulator may be configured as a generally solid rectangular bulk member, having a side edge height and width of 3.5 mm, and a length along the optical axis 22 that is considerably shorter than the relatively long coherent interaction length (e.g, 42 mm), described above.

As a non-limiting example, the Raman Nath or near Raman Nath interaction length of each of the two orthogonally polarized modulators may lie in a range of 20–30 mm having associated AO Q values in a range of 1.9–2.8. At an interaction length of 20 mm and an AO Q of 1.9 per modulator, measurements have revealed that a cascaded pair of such elements is capable of providing an average loss modulation efficiency of 82.3% or higher. At an interaction length of 30 mm and an AO Q of 2.8 per modulator, measurements have revealed that a cascaded intra-cavity pair of wide acceptance angle devices is capable of providing an average loss modulation efficiency of 85.9% or higher. These values are well in excess of the above referenced 75% depletion value necessary to prevent the laser cavity from lasing under high gain and intense pumping conditions.

Figure 2:
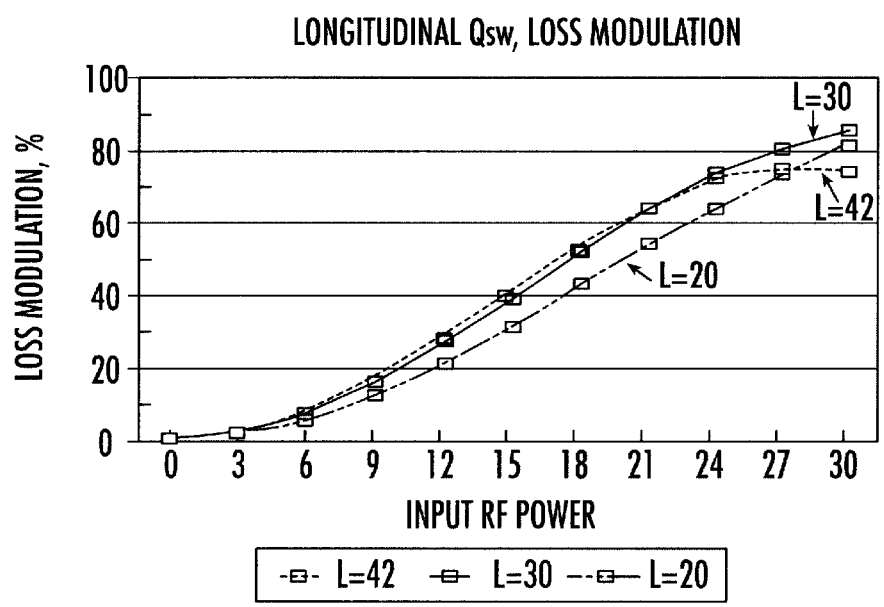
FIG. 2 is a graphical plot of loss modulation versus input RF power for three different Q-switch lengths.
Figure 3:
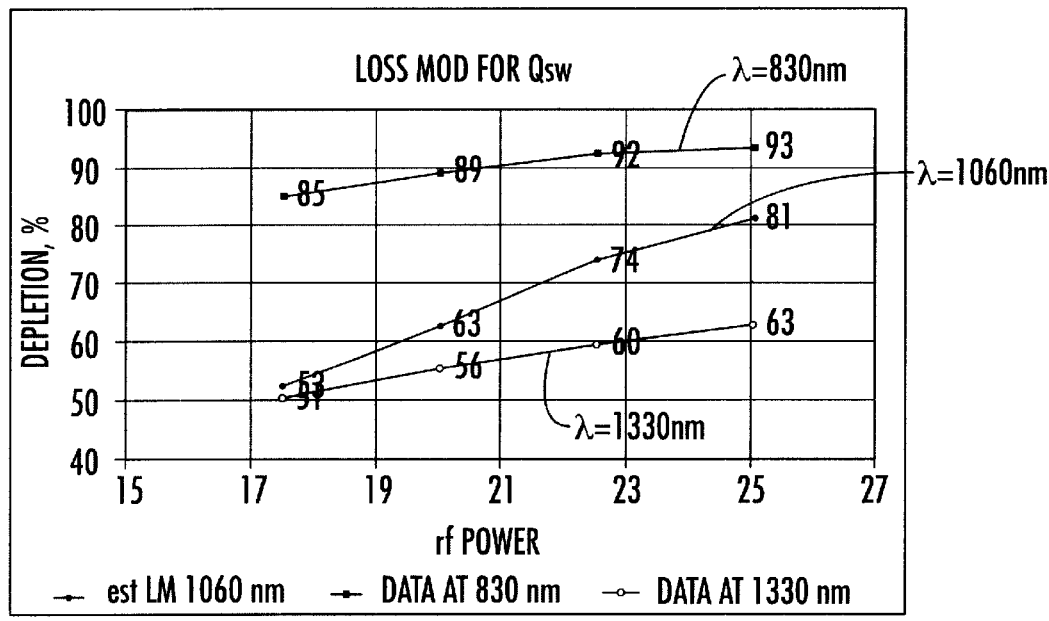
FIG. 3 is a set of measured data plots of variation in depletion (%) vs. RF power for a wide acceptance angle Q-switch of the invention having a Raman Nath or near Raman Nath interaction length of 20 mm.
Figure 4:
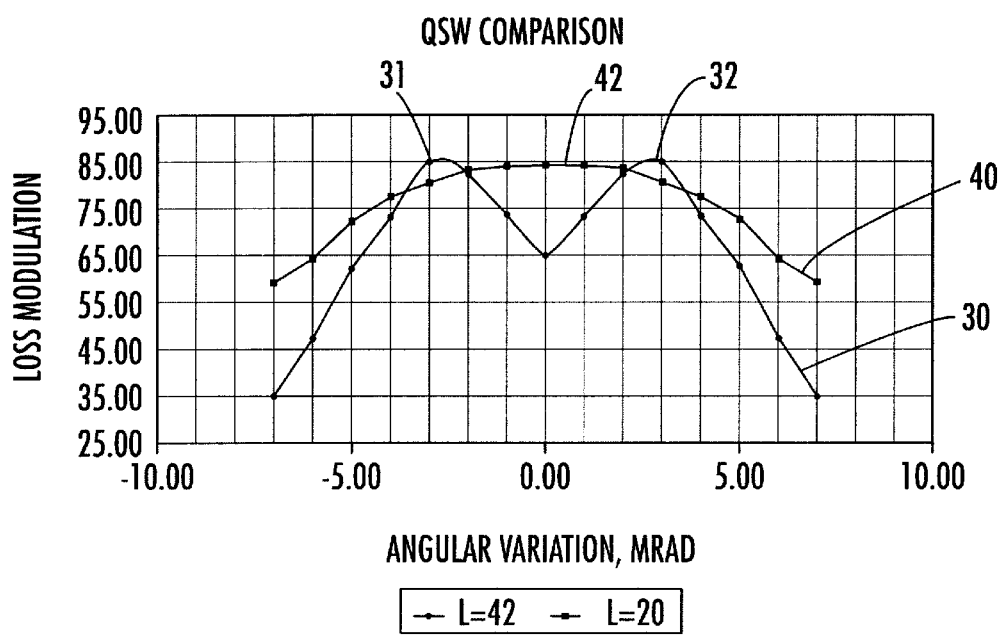
FIG. 4 is a graphical comparison in the loss modulation efficiency for variations in angular divergence off an axis normal to the front face of the bulk material of a wide acceptance angle Q-switch architecture.
Figure 6:
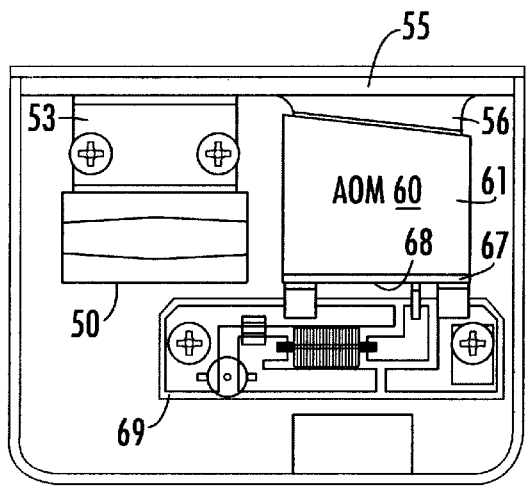
FIGS. 5, 6 and 7 are respective top, end and front views of a support and cooling arrangement for a cascaded arrangement of discrete wide angle acceptance Q-switch devices.

FIG. 2 is a graphical plot of loss modulation (percent) versus input RF power for three different Q-switch lengths: 42 mm; 30 mm and 20 mm. At a drive power of 30 watts, the respective efficiencies are 74.5%, 86% and 82.3%. FIG. 3 is a set of measured data plots of variation in depletion (%) vs. RF power for a wide acceptance angle Q-switch of the invention having a Raman Nath or near Raman Nath interaction length of 20 mm and an AO Q of 1.9 for respective beam wavelengths of 830, 1060 and 1330 nm. FIG. 4 is a graphical comparison in the loss modulation efficiency for variations in angular divergence off an axis that is normal to the front face of the bulk material of a wide acceptance angle Q-switch architecture, comprised of a cascaded pair of orthogonally polarized fused silica modulators, each having a Raman Nath or near Raman Nath interaction length of 20 mm and an AO Q of 1.9 per modulator, and a relatively large interaction length, limited acceptance angle Q-switch architecture having an interaction length of 42 mm and AO Q=3.9.

As shown by the characteristic 30 of FIG. 4, the loss efficiency of the relatively long interaction length of the limited acceptance angle device has peaks 31 and 32 (on the order of 85%) at the Bragg angle and drops off sharply on either side of the Bragg angle to a 'valley minimum' value (65%) at zero mrad. On the other hand, the reduced length Raman Nath or near Raman Nath interaction length device of the invention has a 'relatively flat' characteristic 40, having a high efficiency peak 41 (on the order of 82%) at zero mrad and remaining above or proximate to 75% well out to five mrad. Indeed, the characteristic of the large acceptance angle Q-switch of the invention does not drop to a 65% value until a divergence angle of six mrad.

As noted above, the inherent heating of the bulk material that results from the substantial power level may be effectively countered by the incorporation of cooling fluid channels in a heat sink coupled in thermal communication with the bulk material of each of the cascaded orthogonally polarized Q-switch devices. The configuration of the support and cooling arrangement for a cascaded arrangement of discrete devices is diagrammatically illustrated in FIGS. 5–7, while a support and cooling arrangement for devices integrated within the same acousto-optic bulk material is diagrammatically illustrate in FIGS. 8–10.

Figure 5:
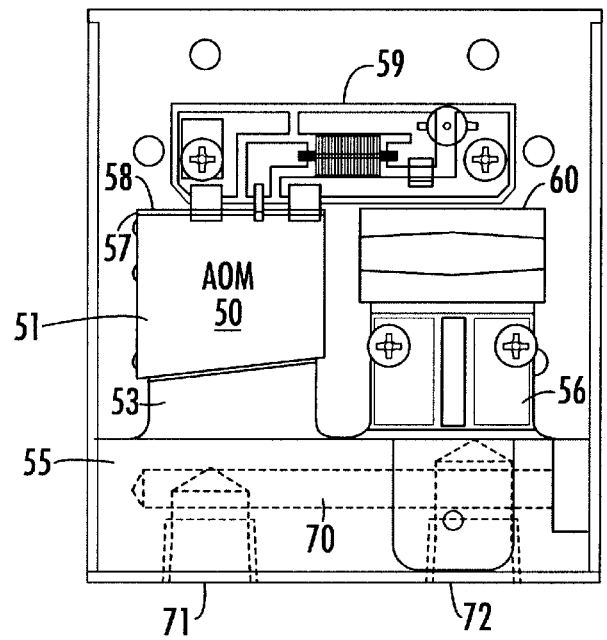

More particularly, as shown in detail in the top view of FIG. 5, a first (X-axis polarization) AOM 50 has the fused silica substrate 51 thereof thermally and mechanically mounted to a first mounting mesa 53 of a heat sink (aluminum) support block 55. An acousto-optic wave-launching transducer 57 for the X-axis acousto-Optic substrate 51 has its input electrode 58 coupled to an RF drive/tuning circuit 59. As shown in the end view of FIG. 6, a second orthogonal (Y-axis) polarization AOM 60 has the fused silica substrate 61 thereof thermally and mechanically mounted to a second mounting mesa 56 of the heat sink (aluminum) support block 55. As the spacing or separation between mesas 53 and 56 of the support block can be effectively minimized within practical mechanical and thermal expansion constraints, the overall distance the randomly polarized laser beam travels through the cascaded modulators is effectively confined to the sum of the non coherent interaction lengths thereof. As noted earlier, this relatively 'short' interaction length provides for a relatively short intra-cavity length for narrower Q-switch pulse applications.

Figure 7:
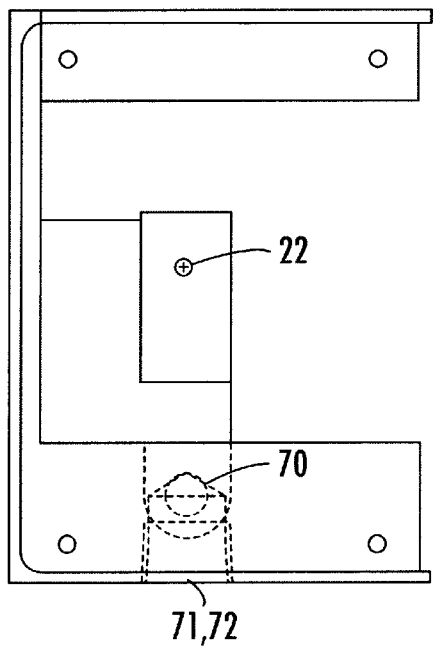

An acousto-optic wave-launching transducer 67 for the (Y-axis) acousto-optic substrate 61 has its input electrode 68 coupled to RF drive/tuning circuitry 69. The uncluttered front view of FIG. 7, shows the optical axis 22 through each of the substrates 51 and 61. In order to cool the bulk material of each of the AOMs 50 and 60, an internal cooling channel 70 is formed within the support block 55 adjacent to the mounting mesas 53 and 56. The cooling channel 70 is externally coupled at ports 71 and 72 to a source of cooling fluid (e.g., water).

In the integrated bulk support and cooling arrangement of FIGS. 8–10, in addition to the provision of an internal channel for the passage of a cooling fluid (e.g. water), the heat sink components of the packaging architecture for the two integrated wide acceptance angle Q-switch modulators are configured to be effectively mechanically floating with respect to the support housing, so as to reduce the build-up of thermally induced stresses. In addition, the heat sink support components are located along separate walls of the support housing, which allows them to be independently mechanically positioned in association with the closely spaced locations of the cascaded X and Y axis modulators, that are integrated within the common acousto-optic bulk to be effectively minimized within practical mechanical and thermal expansion constraints. As a consequence, as in the first embodiment, the overall distance the randomly polarized laser beam travels through the cascaded modulators is effectively confined to the sum of the non coherent interaction lengths thereof. The optical axis through the substrate 80 is shown at 22.

More particularly, as shown in detail in the end view of FIG. 8, a common fused silica substrate 80, in which a first (X-axis polarization) AOM 90 and a second (Y-axis polarization) AOM 100 are integrated, is thermally and mechanically mounted to a first mounting mesa 91 of a first heat sink (aluminum) support block 93. An acousto-optic wave-launching transducer 95 for the X-axis modulator 90 has its input electrode 96 coupled to an RF connector 97, through which an RF drive signal is applied. As shown in the top view of FIG. 9, the heat sink support block 93 is mechanically retained within a support housing 110 by way of a pair of attachment elements (e.g., screws) 111 and 112 that pass through associated elongated slots 113 and 114 in a first top wall 115 of the support housing 110. The elongated slots allow the heat sink support block 93 to effectively 'float' within the housing 110, so as to compensate for thermally induced stresses in the X-axis modulator 90.

The second orthogonal (Y-axis) polarization AOM 100 is thermally and mechanically mounted to a second mounting mesa 101 of a second heat sink (aluminum) support block 103. An acousto optic wave launching transducer 105 for the Y-axis AOM 100 has its input electrode 106 to an RF connector 107, through which an RF drive signal therefor is applied. The separate RF connectors 97 and 107 allows for separate (parallel) RF drive signals to be applied to the respective X-axis and Y-axis modulators. Where a series RF drive for the two modulators is employed, only a single RF connector is needed. Similar to the heat support block 93, the heat sink support block 103 is mechanically retained within the support housing 110 by way of an attachment element (e.g., screw) 116 that passes through an associated elongated slot 117 in an opposite bottom wall 118 of the support housing 110 from top wall 115. As with heat support block 93, the elongated slot 117 allows the heat sink support block 103 to effectively 'float' within the housing 110, and thereby compensate for thermally induced stress build-up in the Y-axis modulator 100.

In order to cool the bulk material of each of the AOMs 90 and 100, respective internal cooling channels 120 and 130 are formed within the support blocks 93 and 103. In particular, a cooling channel 120 is formed in the mesa portion 91 of the support block 93, and a cooling channel 130 is formed in a mesa portion 102 of the support block 103. As shown in the side view of FIG. 10, the cooling channel 120 is externally coupled at ports 121 and 122 to a source of cooling fluid (e.g., water), while cooling channel 130 is externally coupled at ports 131 and 132 to a source of cooling fluid.

Figure 11:
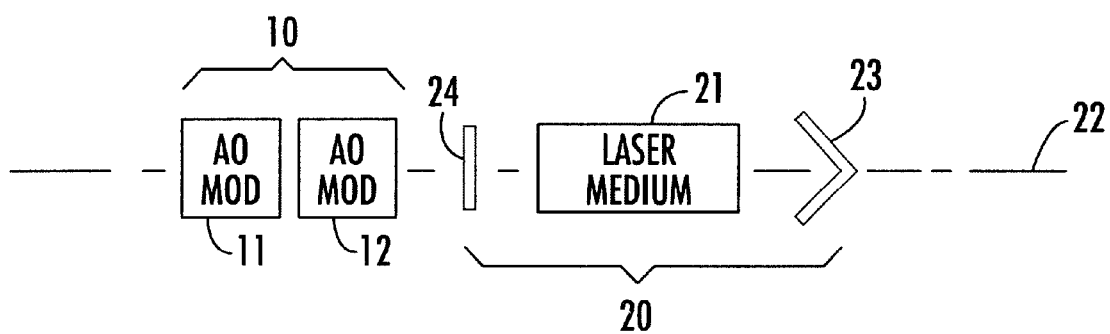
FIG. 11 shows the placement of the cascaded acousto-optic (AO) Q-switch arrangement of the present invention outside a laser resonator used as a loss modulation device.

As pointed out above, the cascaded orthogonally polarized (X–Y) Q-switch architecture of the present invention may be installed either within or external to the laser cavity of a high power laser for different purposes. The substantial improvement in performance of an intracavity device has been described above with reference to FIGS. 1–4. FIG. 11 shows the placement of the cascaded acousto-optic (AO) Q-switch arrangement 10 of the present invention outside the laser resonator 20. As a non limiting example, in this external application, the laser beam output power may be a continuous wave output beam having a power of 300–1000 watts or higher.

In a non-limiting practical example, the cascaded modulator may have an aperture size of 16 mm, which allows for high laser output beam power; also laser beam divergence can be reduced with a larger beam diameter. For a modulator RF drive power of 60 watts, the loss modulation efficiency of a respective X-axis or Y-axis modulator is on the order of 53%. For a drive power of 80 watts, the loss modulation efficiency is increased to a value on the order of 61%. For a drive power of 100 watts, the loss modulation efficiency is increased to 66%. This latter set of parametric data means that a cascaded arrangement of X- and Y-axis devices is capable or producing a combined loss modulation efficiency of 66%+34%×66%, or about 88%, which is sufficient to quench (ON-OFF modulate) a high power (100 watt) laser beam.

In addition to the embodiment described above, the respective AOM devices may be non-coherently driven by using respectively different frequencies for each modulator for shear mode acoustic waves. The minimum frequency difference requires a time bandwidth product of 1 or greater. For example, for a beam width of 3.5 mm (aperture time= 0.93 microseconds), a frequency difference of 1.1 MHz or greater is necessary to achieve a time bandwidth product greater than 1. If one modulator has an input drive frequency of 27.12 MHz, for example, then the other modulator needs to be driven at a frequency of 28.22 MHz or greater, or less than a frequency of 26.02 MHz or lower.

As will be appreciated from the foregoing description, the desire to provide a high modulation loss efficiency, high acceptance angle, Q-switch for a high power (multimode) randomly polarized laser is successfully achieved by a wide acceptance angle, cascaded arrangement of orthogonally polarized AOM devices, in which each AOM has a relatively short, Raman Nath or near Raman Nath interaction length. With the devices being physically and optically 'stacked' relatively close to one another, the overall beam travel distance therethrough is effectively confined to the sum of the respective non coherent interaction lengths thereof. This is not only advantageous when the Q-switch is employed to switch laser beams with large angular divergence, but the relatively short Raman Nath or near Raman Nath interaction length means that the overall intra-cavity length can be reduced for narrower Q-switch pulse applications.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controllably modulating the transmission of a randomly polarized laser beam comprising the steps of:

(a) providing a first acousto-optic modulator having a first Raman Nath or near Raman Nath interaction length for a laser beam at a first linear polarization;

(b) providing a second orthogonal acousto-optic modulator having a second Raman Nath or near Raman Nath interaction length for a laser beam at a second linear polarization different from said first linear polarization; and (c) cascading said second acousto-optic modulator with said first acousto-optic modulator in a beam path of said randomly polarized laser beam in an optically stacked configuration in either one of a discrete construction having a common heat sink support and fused silica substrate supporting each acousto-optic modulator, each thermally and mechanically- mounted to the common heat sink, or an integrated construction having an acousto-optic bulk material, wherein each acousto-optic modulator is formed within the same acousto-optic bulk material, such that the modulations thereby of said randomly polarized laser beam do not interfere with one another and sum incoherently, and the distance said randomly polarized laser beam travels through said first and second acousto-optic modulators is effectively confined to the sum of the respective interaction lengths thereof.

2. A method according to claim 1, wherein said first and second acousto-optic modulators are configured of respectively separate acousto-optic elements.

3. A method according to claim 1, wherein said first and second acousto-optic modulators are integrated in a common acousto-optic substrate.

4. A method according to claim 1, wherein said randomly polarized laser beam is a multi-mode laser beam.

5. A method according to claim 1, wherein said randomly polarized laser beam has a divergence angle of at least four milliradians.

6. A method according to claim 1, wherein said randomly polarized laser beam has a divergence angle of at least five milliradians.

7. A method according to claim 1, wherein step (c) comprises coupling said first and second acousto-optic modulators with a cooling channel structure through which a fluid cooling said first and second acousto-optic modulators passes.

8. A method according to claim 1, wherein step (c) comprises coupling said first and second acousto-optic modulators with a heat sink support structure that is effectively mechanically floating with respect to a housing for said first and second acousto-optic modulators.

9. A method according to claim 1, wherein step (c) comprises cascading said first and second acousto-optic modulators within a laser oscillation cavity of a laser generating said laser beam.

10. A method according to claim 1, wherein step (c) comprises cascading said first and second acousto-optic modulators external of a laser oscillation cavity of a laser generating said laser beam.

11. A method according to claim 1, wherein said first and second acousto-optic modulators comprise longitudinal mode acousto-optic modulators.

12. A method according to claim 1, wherein said first and second acousto-optic modulators comprise shear mode acousto-optic modulators.

13. A method according to claim 1, wherein said second linear polarization is orthogonal to said first linear polarization.

14. A method according to claim 1, wherein transducer input drives for said first and second acousto-optic modulators are coupled to respective first and second RF signal feed ports.

15. A method according to claim 1, wherein transducer input drives for said first and second acousto-optic modulators are coupled in series to an RF signal feed port.

16. An arrangement for controllably modulating a randomly polarized laser beam comprising:

a first acousto-optic modulator having a first Raman Nath or near Raman Nath interaction length for a laser beam having a first linear polarization;

a second orthogonally acousto-optic modulator having a second Raman Nath or near Raman Nath interaction length for a laser beam having a second linear polarization different from said first linear polarization; and wherein said first and second acousto-optic modulators are disposed in cascade along a beam path of said randomly polarized laser beam in an optically stacked configuration in either one of a discrete construction having a common heat sink support and fused silica substrate supporting each acousto-optic modulator, each thermally and mechanically mounted to the common heat sink, or an integrated construction having an acousto-optic bulk material, wherein each acousto-optic modulation is formed within the same acousto-optic bulk material, such that the modulations thereby of said randomly polarized laser beam do not interfere with one another and sum incoherently, and the distance said randomly polarized laser beam travels through said first and second acousto-optic modulators is effectively confined to the sum of the respective interaction lengths thereof.

17. An arrangement according to claim 16, wherein said first and second acousto-optic modulators are configured of respectively separate acousto-optic elements.

18. An arrangement according to claim 16, wherein said first and second acousto-optic modulators are integrated in a common acousto-optic substrate.

19. An arrangement according to claim 16, further including a cooling channel structure coupled to said first and second acousto-optic modulators and through which a fluid cooling said first and second acousto-optic modulators passes.

20. An arrangement according to claim 16, further including a heat sink support structure that is effectively mechanically floating with respect to a housing for said first and second acousto-optic modulators.

21. An arrangement according to claim 16, wherein said first and second acousto-optic modulators are cascaded within a laser oscillation cavity of a laser generating said laser beam.

22. An arrangement according to claim 16, wherein said first and second acousto-optic modulators are cascaded external of a laser oscillation cavity of a laser generating said laser beam.

23. An arrangement according to claim 16, wherein said first and second acousto-optic modulators comprise longitudinal mode acousto-optic modulators.

24. An arrangement according to claim 16, wherein said first and second acousto-optic modulators comprise shear mode acousto-optic modulators.

25. An arrangement according to claim 16, wherein said second linear polarization is orthogonal to said first linear polarization.

26. An arrangement according to claim 16, wherein transducer input drives for said first and second acousto-optic modulators are coupled to respective first and second RF signal feed ports.

27. An arrangement according to claim 16, wherein transducer input drives for said first and second acousto-optic modulators are coupled in series to an RF signal feed port.

28. An arrangement for controllably modulating a randomly polarized laser beam comprising:

a first acousto-optic modulator configured for a first linear polarization and having a first relatively short, Raman Nath or near Raman Nath interaction length for said first linear polarization that achieves a loss modulation efficiency sufficiently high to prevent the laser cavity from lasing under high gain and intense pumping conditions, when an incident laser beam has an acceptance angle that is not aligned with the Bragg angle; and a second acousto-optic modulator configured for a second linear polarization orthogonal to said first linear polarization, and having a second Raman Nath or near Raman Nath interaction length for said second linear polarization that achieves a loss modulation efficiency sufficiently high to prevent the laser cavity from lasing under high gain and intense pumping conditions, when an incident laser beam has an acceptance angle that is not aligned with the Bragg angle; and wherein said first and second acousto-optic modulators are disposed in cascade along a beam path of said randomly polarized laser beam, such that modulations thereby of said randomly polarized laser beam do not interfere with one another and sum incoherently, and the distance said randomly polarized laser beam travels through said first and second acousto-optic modulators is effectively confined to the sum of the respective interaction lengths thereof.

29. An arrangement according to claim 28, wherein said first and second acousto-optic modulators comprise longitudinal mode acousto-optic modulators.

30. An arrangement according to claim 28, wherein said first and second acousto-optic modulators comprise shear mode acousto-optic modulators.

* * * * *